United States Patent [19]
Kobori et al.

[11] Patent Number: 6,166,922
[45] Date of Patent: Dec. 26, 2000

[54] CURRENT OSCILLATION CONTROL RESONANCE CIRCUIT AND POWER SUPPLY APPARATUS UTILIZING THE SAME CIRCUIT

[75] Inventors: Makoto Kobori; Susumu Kaneko, both of Miyagi, Japan

[73] Assignee: Sony Corporation, Tokyo, Japan

[21] Appl. No.: 09/426,342

[22] Filed: Oct. 25, 1999

[30] Foreign Application Priority Data

Oct. 26, 1998 [JP] Japan ................................. 10-304376

[51] Int. Cl.$^7$ ........................... H02M 3/335; H02M 3/24; H02M 5/42
[52] U.S. Cl. .................................. 363/17; 363/25; 363/97
[58] Field of Search ............................... 363/17, 132, 16, 363/24, 25, 55, 56, 95, 97, 131, 134

[56] References Cited

U.S. PATENT DOCUMENTS

| | | | |
|---|---|---|---|
| 5,321,235 | 6/1994 | Makino et al. | 363/98 |
| 5,719,755 | 2/1998 | Usui | 363/19 |
| 5,748,458 | 5/1998 | Ochiai | 363/17 |
| 5,965,989 | 10/1999 | Mader | 363/25 |
| 6,021,052 | 2/2000 | Unger et al. | 363/26 |
| 6,038,142 | 3/2000 | Fraidlin et al. | 363/17 |

*Primary Examiner*—Peter S. Wong
*Assistant Examiner*—Bao Q. Vu
*Attorney, Agent, or Firm*—Frommer Lawrence & Haug, LLP.; William S. Frommer; Gordon Kessler

[57] ABSTRACT

A current detecting circuit detects amplitude of a current flowing toward the connecting point of a first transistor and a serial circuit through a second transistor and a comparing circuit compares amplitude of the current detected by the current detecting circuit with the reference value. An oscillation control circuit controls a control current supplied to an oscillating circuit in order to raise the oscillation frequency of the oscillating circuit when amplitude of the current detected by the current detecting circuit is smaller than the reference value as a result of comparison by the comparing circuit in view of preventing the oscillation frequency to be further lowered. Therefore, it is no longer required to design the apparatus by giving allowance to take into consideration the temperature characteristics and fluctuation of parts unlike the related art in which the minimum oscillation frequency of the oscillating circuit is set. Accordingly, variable range of the oscillation frequency can be expanded. As a result, it can be prevented that variable range of the oscillation frequency of the oscillating circuit becomes narrower.

9 Claims, 4 Drawing Sheets

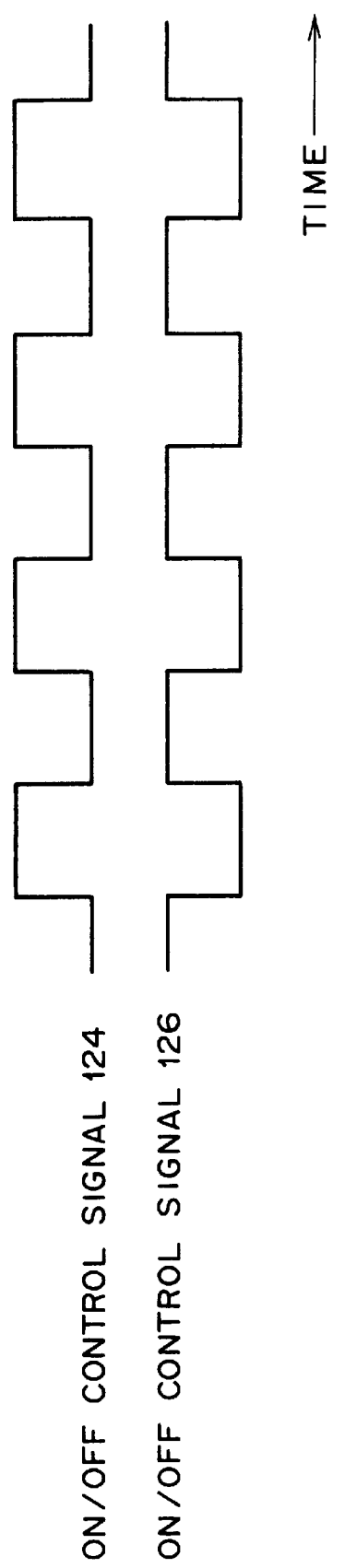

CURRENT OSCILLATION CONTROL RESONANCE CIRCUIT AND POWER SUPPLY APPARATUS UTILIZING THE SAME CIRCUIT

BACKGROUND OF THE INVENTION

1. Field of the Invention

The present invention relates to a current resonance circuit and a power supply apparatus utilizing a current resonance circuit.

2. Description of the Related Art

FIG. 3 is a circuit diagram of essential portion illustrating an example of the power supply apparatus utilizing a current resonance circuit of the related art. First, the power supply apparatus utilizing a current resonance circuit of the related art will be explained with reference to FIG. 3.

This power supply apparatus 102 is a switching power supply apparatus comprising, as illustrated in FIG. 3, an oscillating circuit 104, first and second transistors 106, 108, a transformer 110, a capacitor 112, a rectifying circuit 114 and an oscillation control circuit 116. Here, the oscillating circuit 104, first and second transistors 106, 108, transformer 110 and capacitor 112 form a current resonance circuit 118.

The primary coil of transformer 110 and capacitor 112 are connected in series to form a serial circuit 120. The drain of the first transistor 106 is connected to the power supply line 122, the source is connected to one end of the serial circuit 120, while the other end of the serial circuit 120 is connected to the ground. Meanwhile, the drain and source of the second transistor 108 are respectively connected to both ends of the serial circuit120.

The oscillating circuit 104 oscillates in the frequency depending on a given control current and generates, as illustrated in the waveforms of FIG. 4, a couple of rectangular AC signals including phase difference of about 180 degrees, namely the ON/OFF control signals 124, 126 to respectively supply these signals to the gates 128 of first and second transistors 106, 108.

A rectifying circuit 114 rectifies the AC voltage induced on the secondary coil of the transformer 110 and then outputs a DC voltage as an output voltage of the power supply apparatus 102 through an output terminal 132. An oscillation control circuit 116 generates a control current based on the output voltage of rectifying circuit 114 and supplies it to the oscillating circuit 114 to control the oscillation frequency of the oscillating circuit 104 to keep constant an output voltage of the rectifying circuit 114. For example, when a load connected to the output terminal 132 is heavy, or a voltage supplied to the power supply line 122 is low and an output voltage of the rectifying circuit 114 is lowered, a control current output from the oscillating circuit 104 is increased, for example, so that the oscillating frequency of the oscillating circuit 104 becomes lower in order to maintain the output voltage of the rectifying circuit 114.

As explained above, the oscillating circuit 104 is controlled to lower the oscillating frequency when a load is heavy in the power supply apparatus 102 utilizing a current resonance circuit 118 of the related art, but if the oscillating frequency of the oscillating circuit 104 is excessively lowered, difference between the oscillating frequency and self-oscillating frequency of the current resonance circuit 118 becomes large loosing the resonance. As a result, the resonance condition is no longer maintained in the current resonance circuit 118 and the power supply apparatus 102 enters the control disabling condition.

For this purpose, the oscillating circuit 104 has a structure that the oscillating frequency is locked at the minimum frequency so that the frequency is no longer lowered without relation to a value of the control current from the oscillation control circuit 116 when the oscillating frequency is lowered up to the constant frequency. Thereby, the power supply apparatus 102 is prevented to enter the control disabling condition.

Characteristics of parts forming the power supply apparatus generally change depending on temperature and the parts include fluctuation. Accordingly, the oscillating frequency as a limit for leading the power supply apparatus 102 to the control disabling condition changes depending on temperature and is also different in each apparatus depending on fluctuation of parts. Therefore, on the occasion of setting the minimum frequency of the oscillating circuit 104 by adjusting, for example, a variable resistor or the like, such minimum frequency is set with allowance to a little higher value considering temperature characteristics and fluctuation of parts explained above.

However, as a result, variable range of oscillation frequency of the oscillating circuit 104 becomes narrow and therefore variable range of an input voltage (voltage of power supply line 122) and variable range of load become narrow.

SUMMARY OF THE INVENTION

The present invention has been proposed to overcome the problems explained above and it is therefore an object of the present invention to provide a current resonance circuit having prevented that the variable range of oscillation frequency becomes narrow.

It is another object of the present invention to provide a power supply apparatus utilizing a current resonance circuit having expanded the variable range of input voltage and load.

In view of attaining the objects explained above, the present invention proposes a current resonance circuit comprises a serial circuit of coil and capacitor, first and second switching elements and oscillation circuit, wherein the first switching element is connected between a DC voltage source and one end of the serial circuit, the other end of the serial circuit is connected to the reference potential point, second switching element is connected in parallel to the serial circuit, the oscillation circuit oscillates in the frequency depending on the control current or control voltage and generates a couple of AC signals including a phase difference of about 180 degrees to supply these signals as respective ON/OFF control signals of the first and second switching elements. Moreover, this current resonance circuit is characterized in comprising a current detecting means for detecting amplitude of a current flowing toward the connecting point of the first switching element and serial circuit through the second switching element, a comparing means for comparing amplitude of the current detected by the current detecting means with the reference value and an oscillation control means for controlling the control current or control voltage to be supplied to the oscillating circuit in order to raise the oscillation frequency of the oscillating circuit when the amplitude of the current detected by the current detecting means is smaller than the reference value as a result of comparison by the comparing means.

Moreover, the present invention also proposes a power supply apparatus comprising a serial circuit of primary coil of transformer and capacitor, first and second switching elements, oscillating circuit, rectifying circuit for rectifying the voltage induced on the secondary coil of the transformer and a first oscillation control means, wherein the first switching element is connected between a DC voltage source and one end of the serial circuit, the other end of the serial circuit is connected to the reference potential point, the second switching element is connected in parallel to the serial circuit, the oscillating circuit oscillates in the frequency depending on a control current or control voltage and generates a couple of AC signals including a phase difference of about 180 degrees to supply respectively as the ON/OFF control signals to the first and second switching elements and the first oscillation control means generates the control current or control voltage based on an output voltage or output current of the rectifying circuit and supplies these voltage or current to the oscillating circuit to control the oscillation frequency of the oscillating circuit in order to keep constant the output voltage or output current of the rectifying circuit. Moreover, this power supply apparatus is characterized in comprising a current detecting means for detecting amplitude of a current flowing toward the connecting point of the first switching element and serial circuit through the second switching element, a comparing means for comparing an amplitude of current detected by the current detecting means with the reference value and a second oscillation control means for controlling the control current or control voltage supplied to the oscillating circuit in order to raise the oscillation frequency of the oscillating circuit when amplitude of the current detected by the current detecting means is smaller than the reference value as a result of comparison by the comparing means.

In the present invention, the current detecting means detects an amplitude of the current flowing toward the connecting point of the first switching element and serial circuit through the second switching element and the comparing means compares an amplitude of the current detected by the current detecting means with the reference value. The oscillation control means (or second oscillation control means) controls the control current or control voltage supplied to the oscillating circuit in order to raise the oscillation frequency of the oscillating circuit when amplitude of the current detected by the current detecting means is smaller than the reference value as a result of comparison by the comparing means.

When the current resonance circuit comes close to the non-resonance condition, a current detected by the current detecting means gradually becomes small in each period of such AC current flowing into the second switching element. In the present invention, when the current becomes smaller than the reference voltage, the oscillating circuit is controlled to increase the oscillation frequency of the oscillating circuit using the oscillation control means (or second oscillation control means). Therefore, the oscillation frequency is no more lowered and is then locked.

Moreover, in the present invention, since the oscillation frequency is locked depending on that the oscillating circuit actually comes close to the no-resonant condition or not by monitoring the current flowing into the second switching element, it is no longer required to design the oscillating circuit with allowance by considering temperature characteristic and fluctuation of parts unlike the system of the related art to set the lowest oscillation frequency of the oscillating circuit. Therefore, it can be avoided that the variable range of oscillation frequency of the oscillating circuit becomes narrower.

As a result, variable range of an input voltage and load can be expanded in the power supply apparatus utilizing the current resonance circuit of the present invention.

BRIEF DESCRIPTION OF THE DRAWINGS

FIG. 4 is a waveform diagram illustrating output signals of the oscillating circuit forming the power supply apparatus of FIG. 3.

DESCRIPTION OF THE PREFERRED EMBODIMENT

Next, a preferred embodiment of the present invention will be explained with reference to the accompanying drawings.

Figure 1:
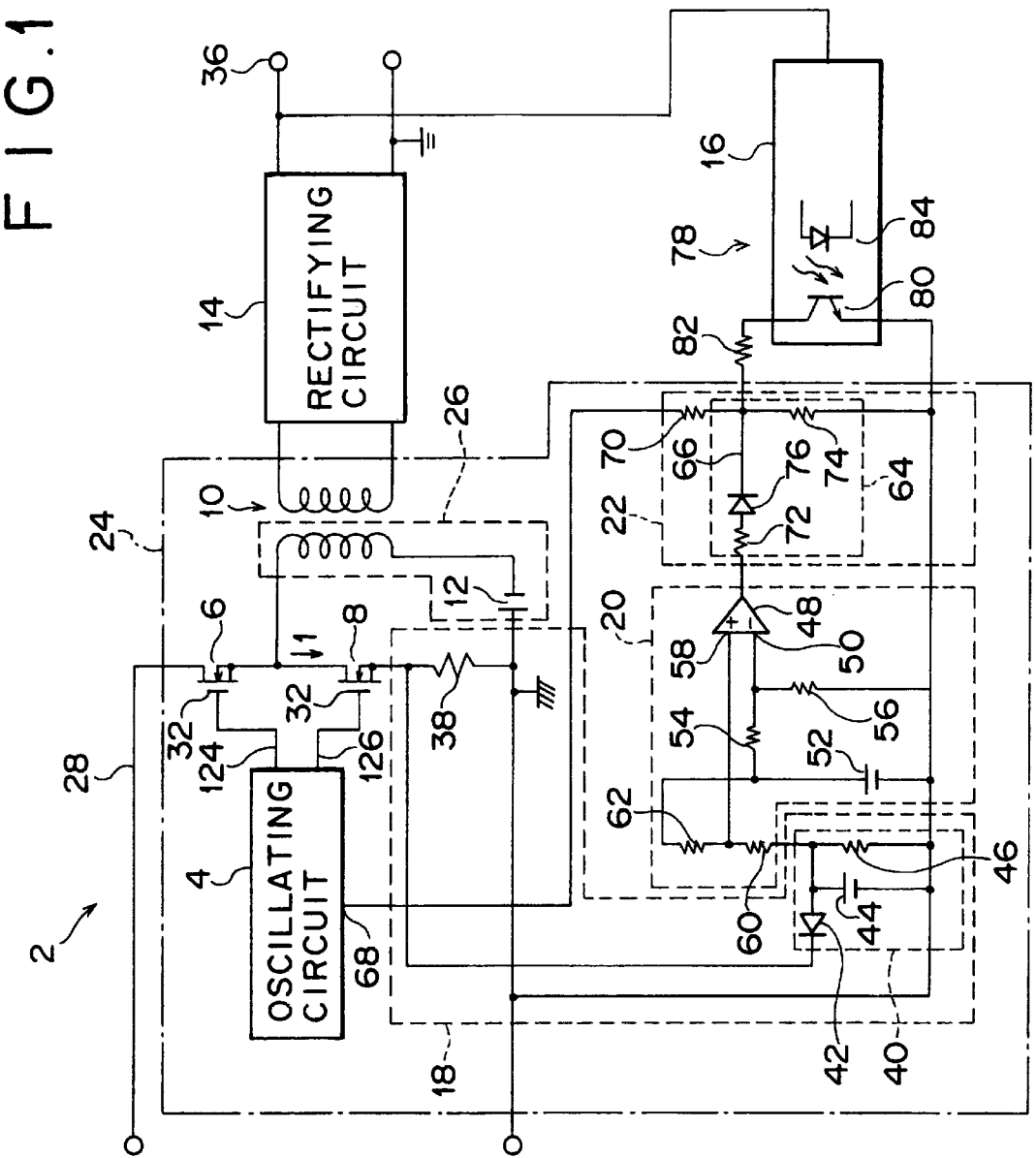
FIG. 1 is a circuit diagram of essential portion illustrating an example of a power supply apparatus using a current resonance circuit of the present invention.

FIG. 1 is a circuit diagram of essential portion illustrating an example of the power supply apparatus using a current resonance circuit of the present invention. An example of the power supply apparatus using the current resonance circuit of the present invention will be explained below with reference to the accompanying drawings and the current resonance circuit of the present invention will also be explained below.

This power supply apparatus 2 is a switching power supply apparatus and also includes, as illustrated in FIG. 1, an oscillation circuit 4, first and second transistors 6, 8, a transformer 10, a capacitor 12, a rectifying circuit 14 and a first oscillation control circuit as the basic structural elements. Moreover, as the elements in relation to the present invention, a current detecting circuit 18, a comparing circuit 20 and a second oscillation control circuit 22 are also included.

Here, the current resonance circuit 24 of the present invention may be structured by the oscillating circuit 4, first and second transistors 6, 8, transformer 10, capacitor 12 current detecting circuit 18, comparing circuit 20 and second oscillation control circuit 22.

The primary coil of transformer 10 and the capacitor 12 are connected in series to form a serial circuit 26. The drain of first transistor 6 is connected to the power supply line 28, while the source is connected to one end of the serial circuit 26 and the other end of serial circuit 26 is connected to the ground. Meanwhile, the source and drain of the second transistor 8 are respectively connected to both ends of the serial circuit 26.

The oscillating circuit 4 oscillates in the frequency depending on the control current and generates a couple of rectangular AC signals 30 including a phase difference of about 180 degree as illustrated in the waveform diagram of FIG. 4 and then respectively supplies these AC signals as the ON/OFF control signals 124, 126 to the gates 32 of the first and second transistors 6, 8.

The rectifying circuit 14 rectifies an AC voltage induced on the secondary coil of the transformer 10 and outputs a DC voltage as an output voltage of the power supply apparatus through the output terminal 36. The oscillation control circuit 16 generates a control current based on the output voltage of the rectifying circuit 14, supplies this current to the oscillating circuit 4 and controls the oscillation frequency of the oscillating circuit 4 in order to keep constant the output voltage of the rectifying circuit 14. For example, when a load connected to the output terminal 36 is heavy or a voltage supplied through the power supply line 28 is low and an output voltage of the rectifying circuit 14 is lowered, a control current output from the oscillating circuit 4, for example, is increased so that the oscillation frequency of the oscillating circuit 4 becomes low to maintain the output voltage of the rectifying circuit 14.

The current detecting circuit 18 forming the current resonance circuit 24 detects amplitude of the current flowing toward the connecting point of the source of first transistor 6 and the serial circuit 26 through the channel of second transistor 8 and is composed of the first resistor 38 connected between the source of second transistor 8 and the ground and a peak rectifying circuit 40 for rectifying the peak of negative voltage generated at one end of first resistor 38 in the opposite side of the ground.

The peak rectifying circuit 40 is formed by comprising a diode 42 of which cathode is connected to the terminal, opposed to the ground, of the first resistor 38, a capacitor 44 and a second resistor 46 connected between the anode of diode 42 and the ground.

The comparing circuit 20 compares a current detected by the current detecting circuit 18, namely an output voltage of the peak rectifying circuit 40 and the reference voltage. In more detail, the comparing circuit 20 includes an operational amplifier 48 as a comparator, a constant voltage is impressed to the inverted input terminal 50 of the operational amplifier 48 by a voltage dividing circuit consisting of a constant voltage source 52 and resistors 54, 56 and a voltage from the peak rectifying circuit 40 is applied to the non-inverted input terminal 58 through the voltage dividing circuit of resistors 60, 62.

The second oscillation control circuit 22 controls a control current to be supplied to the oscillating circuit 4 in order to raise the oscillation frequency of the oscillating circuit 4 when amplitude of current detected by the current detecting circuit 18 is lower than the reference voltage as a result of comparison by the comparing circuit 20.

The second oscillation control circuit 22 is formed by comprising a rectifying circuit 64 for rectifying an output voltage of the operational amplifier 48 and a third resistor 70 connected between an output terminal 66 of the rectifying circuit 65 and a control terminal 68 of the oscillating circuit 4 for supplying the control current to the oscillating circuit 4. The rectifying circuit 64 includes the fourth and fifth resistors 72, 74 and a diode 76. One end of the fourth resistor 72 is connected to the output of operational amplifier 48, while the other end to the anode of diode 76. The fifth resistor 74 is connected between the cathode of diode 42 and the ground. Only the positive voltage of an output of the operational amplifier 48 is supplied to the control terminal 68 through the third resistor 70.

An output of the first oscillation control circuit 16 is formed of a photo-coupler 78 and the emitter of photo-transistor 80 forming the photo-coupler 78 is connected to the ground, while the collector to the output terminal 66 of the rectifying circuit 64 through the resistor 82. Amount of light emission of the photodiode 84 changes depending on an output voltage of the rectifying circuit 14. As a result, a conductive resistance of the photo-transistor 80 changes, causing amplitude of the current, output from the control terminal 68 through the third resistor 70 and resistor 82, to change. Thereby, the oscillation frequency of the oscillating circuit 4 also changes.

Next, operation of the power supply apparatus structured as explained above will then be explained.

First, waveform of the current I flowing through the second transistor will be explained.

The oscillating circuit 4 generates the ON/OFF control signals 124, 126 illustrated in FIG. 4 and respectively impresses these control signals to the gates of first and second transistors 6, 8. As a result, the first and second transistors 6, 8 repeatedly turn ON and OFF with each other. An AC current of the same frequency as the ON/OFF control signals 124, 126 flows into the second transistor 8.

FIGS. 2A to 2E are waveform diagrams illustrating the waveforms in one period of the current I flowing into the second transistor 8.

Figure 2A:
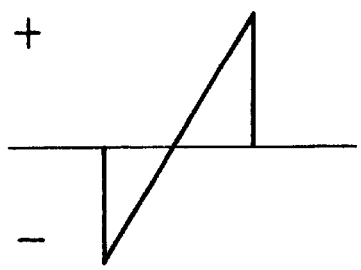
FIGS. 2A to 2E are waveform diagrams in one period of a current flowing into a second transistor forming the power supply apparatus of FIG. 1.

For example, when a load connected to the output terminal 36 is rather small, the waveform of current I shows, as illustrated in FIG. 2A, that the positive peak value is almost identical to the negative peak value. The current I flowing in the direction indicated by the arrow mark in FIG. 1 is defined as positive current, while the current I flowing in the opposite direction as negative current.

However, when a load becomes heavier, amount of light emission of photodiode 84 increases in the first oscillation control circuit 16 and thereby a conductive resistance of photo-transistor 80 becomes small, the oscillation frequency of the oscillating circuit 4 is lowered. As a result, deviation from the resonance frequency of the oscillation frequency becomes large and thereby positive peak value becomes large and negative peak value becomes small as illustrated in FIG. 2B.

Figure 2B:
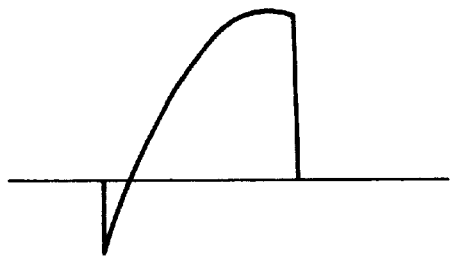
Figure 2C:
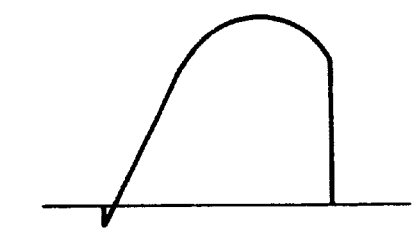

When a load of the power supply apparatus 2 becomes heavier, since the oscillation frequency of oscillating circuit 4 is controlled to become lower, such trend is intensified and positive peak value becomes still larger while the negative peak value becomes still smaller as illustrated in FIG. 2C.

Figure 2D:
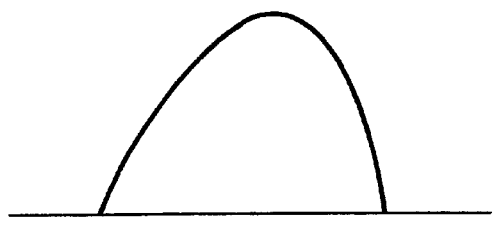
Figure 2E:
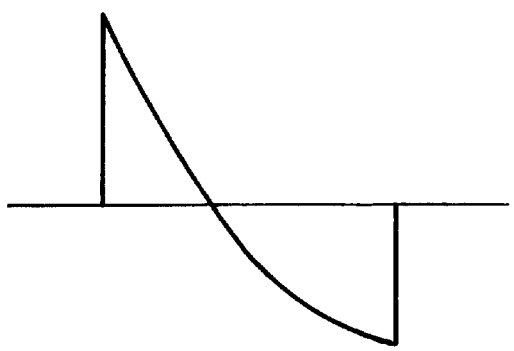
Figure 3:
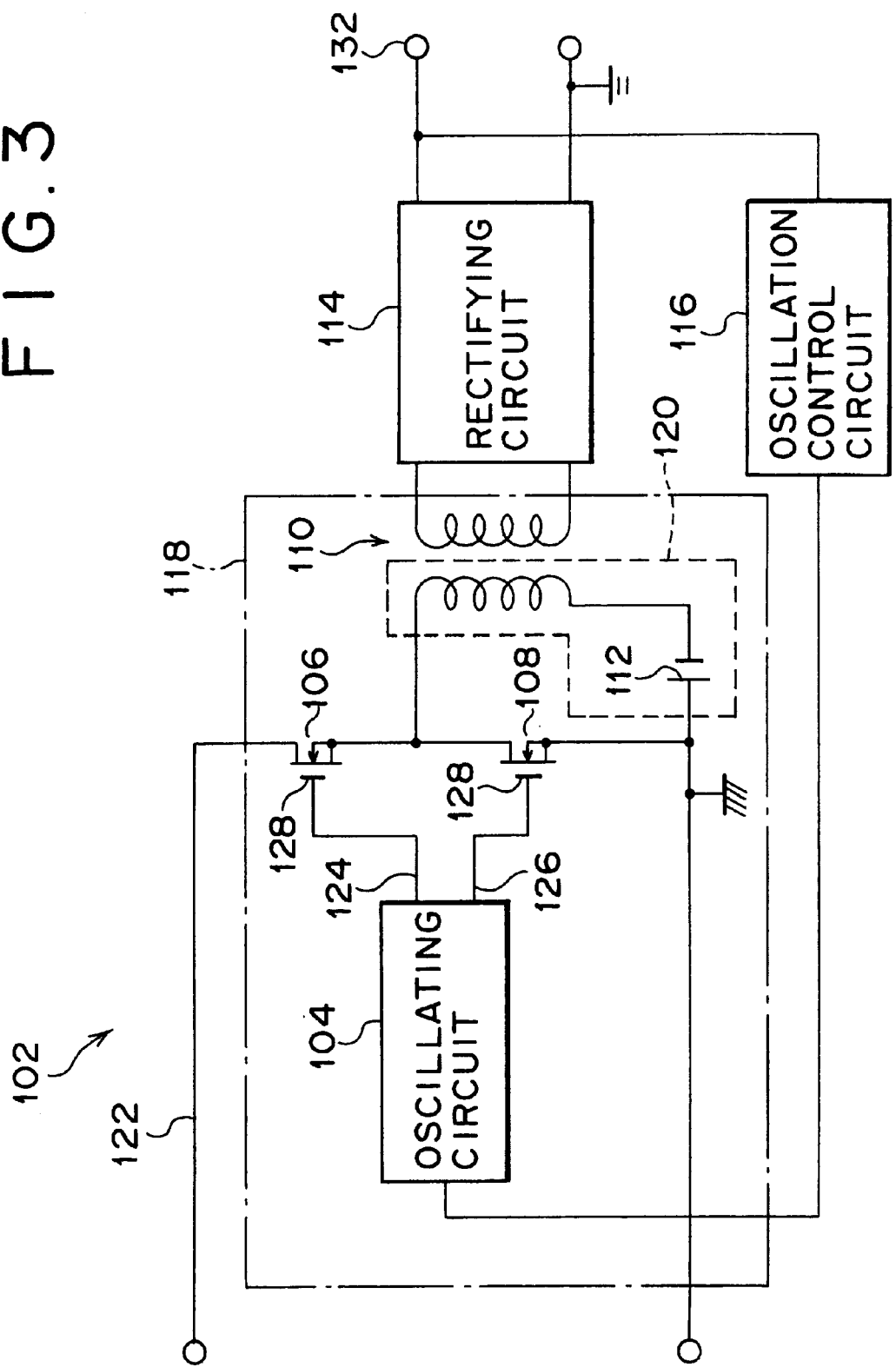
FIG. 3 is a circuit diagram of essential portion illustrating an example of a power supply apparatus using a current resonance circuit of the related art.

When a load becomes further heavier, the waveform of current I changes to that illustrated in FIG. 2D. When a load becomes further heavier and the oscillation frequency is lowered, no-resonance condition occurs and thereby the waveform of current I changes to that illustrated in FIG. 2E.

In the power supply apparatus of this embodiment, excessive lowering of the oscillation frequency of the oscillating circuit 4 is prevented by utilizing the effect that the negative peak value of the waveform of current I is gradually lowered as illustrated in FIGS. 2B and 2C in the stage before occurrence of no-resonant condition.

Namely, since the first resistor 38 is connected in series to the second transistor 8, a voltage of the waveform identical to that of the current flowing into the second transistor 8 is generated at both ends of the first resistor and the peak rectifying circuit 40 rectifies the negative peak value generated at the terminal 86 of the first resistor 38. As a result, a voltage corresponding to the peak value of negative current flowing into the second transistor 8, namely a voltage corresponding to the peak value of current flowing in the opposite direction to that of the current I indicated by the arrow mark in FIG. 1 is generated at the output of the peak rectifying circuit 40, namely at the anode of the diode 42.

The operational amplifier 48 forming a comparing circuit 20 compares a voltage divided from the output voltage of the peak rectifying circuit 40 with resistors 60, 62 with the reference voltage generated by dividing the voltage of a constant voltage source 52 with resistors 54, 56 and outputs a positive constant voltage when the former is larger than the latter and also outputs a negative constant voltage in the opposite case. Here, as illustrated in FIG. 2C, the resistors 54, 56, 60, 62 and voltage of the constant voltage source 52 are set so that the output voltage of the operational amplifier 48 is switched to positive from negative in the stage a little before the change of negative peak value of current I to become zero.

When the output voltage of operational amplifier 48 is negative, since this negative voltage is impeded, amplitude of the current output from the oscillating circuit 4 through the control terminal 68 of the oscillating circuit 4 is determined only by a conductive resistance of the photo-transistor 80.

On the other hand, when the output voltage of operational amplifier 48 is positive, this output voltage is impressed to the control terminal 68 through the rectifying circuit 64 and the third resistor 70. This positive voltage causes the current to enter the oscillating circuit 4 through the control terminal 68. Accordingly, a current output from the control terminal 68 is lowered by the photo-transistor 80. As a result, the oscillation frequency of the oscillating circuit 4 is raised.

Therefore, a load of the power supply apparatus 2 become heavier or an input voltage supplied from the power supply line 28 is lowered. Thereby, the oscillating circuit 4 is controlled to provide a lower oscillation frequency. As a result, when the waveform of current I changes to that illustrated in FIG. 2C, an output voltage of the operational amplifier 48 is inverted to becomes positive voltage. Accordingly, the oscillation frequency of the oscillating circuit 4 is prevented to become lower and is then locked.

As explained above, in the power supply apparatus 2 of this embodiment, the oscillation frequency of the oscillating circuit 4 is locked by monitoring a current flowing into the second transistor 8 and depending on that the condition is actually near to the no-resonant condition or not. Therefore, it is no longer required to design the apparatus by giving allowance considering temperature characteristics and fluctuation of parts, unlike the related art system in which the minimum oscillation frequency of the oscillating circuit is set. Accordingly, it can be prevented that variable range of oscillation frequency of the oscillating circuit 4 becomes narrower.

As a result, the variable range of input voltage and load of the power supply apparatus 2 can be expanded more than that of the related art.

Moreover, since it is no longer required to adjust the variable resistors to set the lowest frequency which is done in the related art, working steps can be reduced and manufacturing cost can also be saved.

Since the parts used allow a certain degree of fluctuation, rather low price parts may be used and it is also effective for reduction of cost.

In addition, circuit design can be realized easily because it is no longer required to take particular consideration to temperature characteristics and fluctuation of parts.

In this embodiment, the current resonance circuit 24 of the present invention is introduced into the power supply apparatus, but the current resonance circuit 24 of the present invention can also be widely applied to the apparatuses other than the power supply apparatus.

Moreover, in this embodiment, the power supply apparatus 2 is defined to output a constant voltage but the present invention is also effective for the power supply apparatus which outputs a constant current. In this case, the first oscillation control circuit 16 controls the frequency of the oscillating circuit 4 based on the output current of the power supply apparatus 2.

In addition, the oscillation frequency of the oscillating circuit 4 is controlled by the control current in this embodiment, but the present invention is of course effective when the oscillating circuit which is controlled in the oscillation frequency by the control voltage is used.

As explained above, in the present invention, the current detecting means detects amplitude of the current flowing toward the connecting point of the first switching element and serial circuit through the second switching element, while the comparing means compares amplitude of the current detected by the current detecting means with the reference value. And, the oscillation control means (or second oscillation control means) controls the control current or control voltage supplied to the oscillating circuit in order to raise the oscillation frequency of the oscillating circuit when amplitude of the current detected by the current detecting means is smaller than the reference value as a result of comparison by the comparing means.

When the current resonance circuit comes near to the no-resonant condition, the current detected by the current detecting means gradually becomes small in each period of the AC current flowing into the second switching element. In the present invention, when the current becomes smaller than the reference value, the oscillating circuit is controlled to raise the oscillation frequency of the oscillating circuit by the oscillation control means (or the second oscillation control means). Accordingly, the oscillation frequency is no more lowered and is locked.

In the present invention, since the oscillation frequency is locked by monitoring a current flowing into the second switching element and depending on that the frequency actually comes near to the no-resonant condition or not, it is no longer required to design the apparatus by giving allowance considering temperature characteristics and fluctuation of parts, unlike the related art to set the minimum oscillation frequency of the oscillating circuit and therefore it can be prevented that the variable range of the oscillation frequency of the oscillating circuit becomes narrow.

Moreover, as a result, the variable range of input voltage and load can also be expanded in the power supply apparatus utilizing the current resonance circuit of the present invention.

In addition, since it is no longer required to adjust the variable resistors for setting the minimum frequency which is done in the related art, working steps can be reduced and manufacturing cost can also be reduced.

Moreover, since the parts having a certain fluctuation may be used, low price parts can be used and it is effective to reduction of cost.

Further, apparatus can be designed easily because it is no longer required to take particular consideration to temperature characteristics and fluctuation of parts for circuit design.

What is claimed is:

1. A current resonance circuit including a serial circuit of coil and capacitor, first and second switching elements and oscillating circuit in which said first switching element is connected between a DC voltage source and one end of said serial circuit, the other end of said serial circuit is connected to the reference potential point, said second switching element is connected in parallel to said serial circuit and said oscillating circuit generates a couple of AC signals including phase difference of about 180 degrees by oscillating in the frequency depending on a control current or control voltage and respectively supplies these AC signals to said first and second switching elements as the ON/OFF control signals;

said current resonance circuit comprising:

current detecting means for detecting amplitude of current flowing toward the connecting point of said first switching element and said serial circuit through said second switching element;

comparing means for comparing amplitude of current detected by said current detecting means with the reference value; and oscillation control means for controlling said control current or control voltage supplied to said oscillating circuit in order to raise the oscillation frequency of said oscillating circuit when amplitude of current detected by said current detecting means is smaller than said reference value as a result of comparison by said comparing means.

2. A current resonance circuit as claimed in claim 1, wherein said current detecting means includes a first resistor connected between one end of the reference potential point side of said second switching element and the reference potential point and a peak rectifying circuit for rectifying the peak value of the negative voltage generated at one end of said first resistor in the opposite side of the reference potential point.

3. A current resonance circuit as claimed in claim 2, wherein said comparing means includes a comparator in which a constant voltage is impressed to one input terminal thereof and a voltage from said peak rectifying circuit is impressed to another input terminal.

4. A current resonance circuit as claimed in claim 3, wherein said comparator is formed of an operational amplifier.

5. A current resonance circuit as claimed in claim 3, wherein an output voltage of said peak rectifying circuit is supplied to an input terminal of said comparator through a voltage dividing circuit of resistor.

6. A current resonance circuit as claimed in claim 2, wherein said peak rectifying circuit is formed of a diode of which cathode is connected to said one end of said first resistor and capacitor and second resistor connected between the anode of said diode and reference potential point.

7. A current resonance circuit as claimed in claim 3, wherein said oscillation control circuit is formed by comprising a second rectifying circuit for rectifying an output voltage of said comparator and a third resistor connected between an output terminal of said second rectifying circuit and control terminal of said oscillating circuit to supply said control current or control voltage to said oscillating circuit.

8. A current resonance circuit as claimed in claim 7, wherein said second rectifying circuit is formed by comprising a second diode connected in series to output of said comparator.

9. A power supply apparatus including a serial circuit of primary coil of transformer and capacitor, first and second switching elements, an oscillating circuit, a rectifying circuit for rectifying a voltage induced on the secondary coil of said transformer and a first oscillation control means in which said first switching element is connected between a DC voltage source and one end of said serial circuit, another end of said serial circuit is connected to the reference potential point, said second switching element is connected in parallel to said serial circuit, said oscillating circuit oscillates in the frequency depending on the control current or control voltage to generated a couple of AC signals including phase difference of about 180 degrees and supplies these AC signals to said first and second switching elements as the ON/OFF control signals and said first oscillation control means generates said control current or control voltage depending on an output voltage or output current of said rectifying circuit and supplies such control current or voltage to said oscillating circuit to control the oscillation frequency of said oscillating circuit in order to keep constant an output voltage or current of said rectifying circuit, said power supply apparatus comprising:

current detecting means for detecting amplitude of current flowing toward the connecting point of said first switching element and said serial circuit through said second switching element;

comparing means for comparing amplitude of current detected by said current detecting means with the reference value; and second oscillation control means for controlling said control current or voltage supplied to said oscillating circuit in order to raise the oscillation frequency of said oscillating circuit when amplitude of said current detected by said current detecting means is smaller than said reference value as a result of comparison by said comparing means.

* * * * *